(12) United States Patent
Rhodes

(10) Patent No.: US 6,213,714 B1
(45) Date of Patent: Apr. 10, 2001

(54) COOLED AIRFOIL

(75) Inventor: Jeffrey F. Rhodes, Zionsville, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 09/342,826

(22) Filed: Jun. 29, 1999

(51) Int. Cl.[7] .................................................. F01D 5/08
(52) U.S. Cl. ........................................ 416/96 R; 416/97 R
(58) Field of Search .................................... 415/115, 116, 415/176, 178; 416/96 R, 97 R

(56) References Cited

U.S. PATENT DOCUMENTS

| | | |
|---|---|---|
| 4,063,851 | 12/1977 | Welson . |
| 4,672,727 | 6/1987 | Field . |
| 4,762,464 | 8/1988 | Vertz et al. . |
| 4,768,700 | * 9/1988 | Chen ..................................... 228/159 |
| 5,152,667 | 10/1992 | Turner et al. . |
| 5,246,340 | 9/1993 | Winstanley et al. . |
| 5,288,207 | 2/1994 | Linask . |
| 5,353,865 | * 10/1994 | Adiutori et al. ....................... 165/133 |
| 5,374,162 | 12/1994 | Green . |
| 5,383,766 | 1/1995 | Przirembel et al. . |
| 5,387,085 | 2/1995 | Thomas, Jr. et al. . |
| 5,405,242 | 4/1995 | Auzier et al. . |
| 5,419,681 | 5/1995 | Lee . |
| 5,458,461 | 10/1995 | Lee et al. . |
| 5,472,316 | 12/1995 | Taslim et al. . |
| 5,496,151 | 3/1996 | Coudray et al. . |
| 5,498,133 | 3/1996 | Lee . |
| 5,511,946 | 4/1996 | Lee et al. . |
| 5,533,864 | 7/1996 | Nomoto et al. . |
| 5,649,806 | * 7/1997 | Scricca et al. ........................ 145/115 |
| 5,976,337 | * 11/1999 | Korinko et al. ...................... 204/487 |

FOREIGN PATENT DOCUMENTS

937946 * 8/1999 (EP) .

* cited by examiner

Primary Examiner—Christopher Verdier
Assistant Examiner—Ninh Nguyen
(74) Attorney, Agent, or Firm—Woodard, Emhardt, Naughton, Moriarty & McNett

(57) ABSTRACT

An actively cooled component having a plurality of film cooling discharge apertures passing through a heat transfer pedestal. In one embodiment the pedestal is elongated so as to provide good covered turning for the cooling media exiting the cooled component. In one embodiment the discharge aperture has a L/D ratio in the range of about two to three.

40 Claims, 8 Drawing Sheets

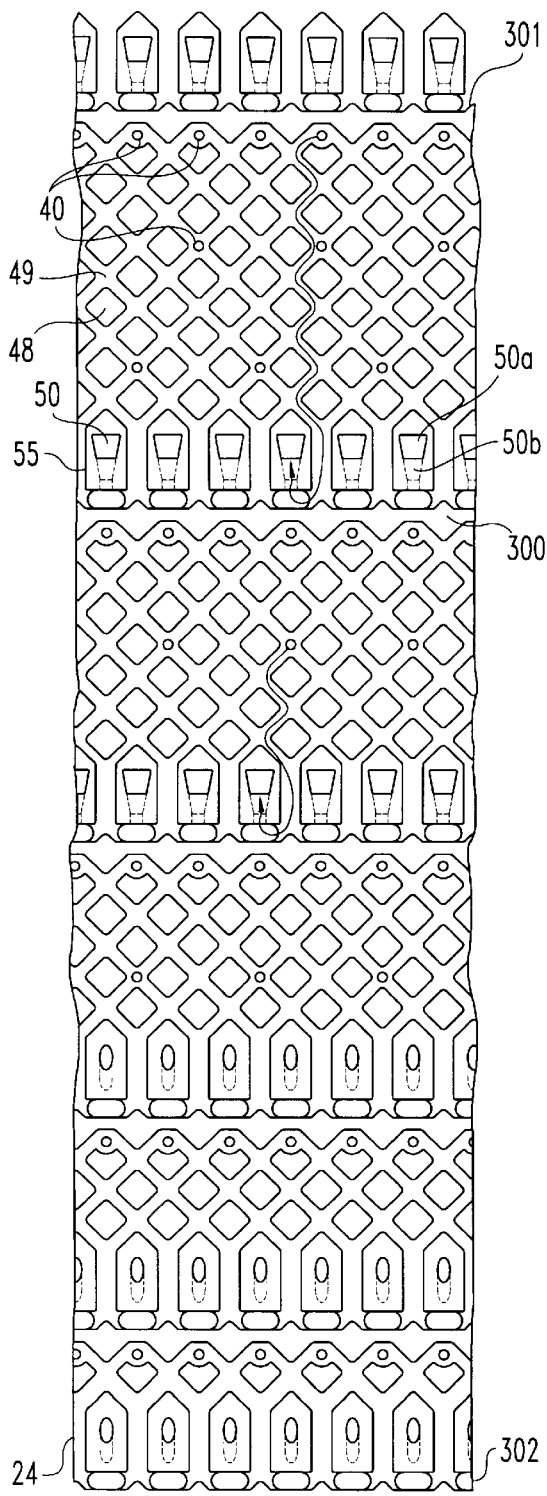
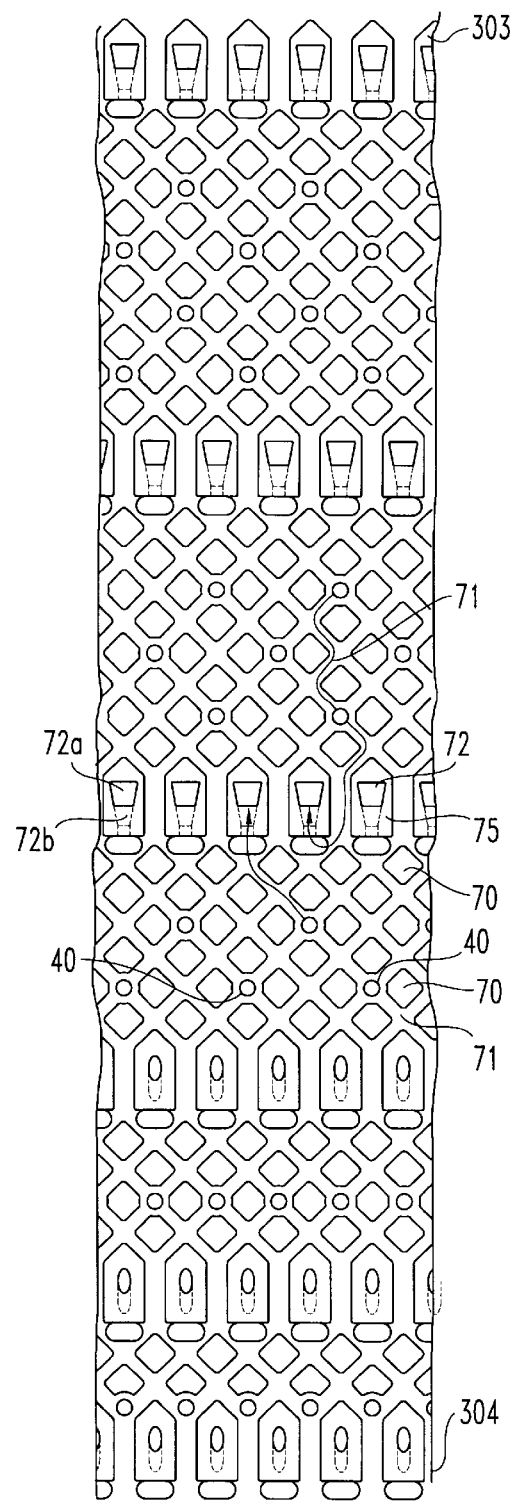
*Fig. 5a*  *Fig. 5b*

COOLED AIRFOIL

BACKGROUND OF THE INVENTION

The present invention relates generally to the cooling of jet engine components having surfaces exposed to the flow of high temperature gas. More particularly, in one embodiment the present invention defines a turbine vane or blade having internal passageways and exit holes for the passage of cooling media necessary for cooling the component. Although the present invention was developed for use in a gas turbine engine, certain applications may be outside of this field.

A gas turbine engine is typical of turbomachinery in which the concept described herein may be advantageously employed. It is well known that a gas turbine engine conventionally comprises a compressor for compressing air to the proper pressure required for supporting the combustion of fuel in a combustion chamber. The high temperature gas exiting the combustion chamber provides the working fluid for the turbine, which powers the compressor. The turbine, which is driven by the flow of high temperature gas, is utilized to turn a propeller, fan or other device. Further, the high temperature gas may be used directly as a thrust for providing motive power, such as in a turbine jet engine.

It is well known that the performance of a gas turbine engine increases with the increase in the operating temperature of the high temperature gas exiting the combustion chamber. A factor limiting the allowable temperature of the gaseous working flow from the combustion chamber is the capability of the various engine components to not degrade when exposed to the high temperature gas flow. Various techniques have been utilized by engine designers to cool the engine components in order to increase the upper limit on the operating temperature of the gaseous working fluid.

A conventional technique, film cooling has been widely utilized to minimize the degradation of the gas turbine engine components exposed to the flow of high temperature gases. Film cooling generally refers to a technique of cooling an external surface of the component that is being heated by the high temperature gas, and involves injecting a relatively cool media, such as air along the component's external surface. The cooling media functions as an insulating layer to reduce the unwanted heating of the external surface of the component by the flow of high temperature gas. A second conventional technique that engine designers have used to allow the use of higher temperature working gases is an internal network of apertures and passageways within the component. A steady flow of pressurized cooling media is passed through the internal passageways of the component, and the cooling media is finally exhausted onto the exterior surface of the component. The passage of the cooling media through the internal passageways and out through the exit aperture provides for convective heat transfer from the walls of the component to the cooling media.

Cooling of the components of the gas turbine engine is preferably accomplished with a minimum amount of cooling media, since the cooling media is working fluid, which has been extracted from the compressor, and its loss from the gas flow rapidly reduces engine efficiency. The engine designer must design an engine to operate within a specified temperature range, while minimizing the amount of cooling media extracted from the compressor. If these design parameters are not satisfied, a corresponding structural degradation of the engine components may result, or the efficiency of the engine may be reduced because an excessive quantity of cooling media was extracted from the compressor.

Although the prior techniques utilizing internal passageways, exit apertures, and film cooling are steps in the right direction for cooling components exposed to high temperature gases, the need for additional improvement still remains. The present invention satisfies this need in a novel and unobvious way.

SUMMARY OF THE INVENTION

One form of the present invention contemplates an actively cooled airfoil having a plurality of cooling pedestals for increasing heat transfer and wherein at least one of the plurality of pedestals has a cooling aperture therethrough.

Another form of the present invention contemplates an apparatus comprising a body, which provides for covered turning for a cooling media exiting the body through an aperture in a thin wall portion of the body.

In one aspect the present invention contemplates an airfoil comprising a body with a cooling passageway therein, a plurality of complexly shaped cooling pedestals within the passageway, a plurality of inlet apertures in fluid communication with a central cavity, and a continuous slot discharge for exiting the cooling media from the body.

Another aspect of the present invention contemplates an actively cooled component comprising: a body having at least one internal passageway for the passage of a cooling media therein, the body having a thin wall with an outer surface; a plurality of pedestals positioned within the passageway and adjacent the thin wall for enhancing heat transfer between the body and the cooling media; and at least one of the plurality of pedestals has an opening therethrough for the passage of the cooling media to the outer surface.

Another aspect of the present invention contemplates an actively cooled component, comprising: a body having an internal passageway for distributing cooling media within the body, the body having an exterior surface; a plurality of pedestals coupled to the body and at least a portion of the plurality of pedestals extending into the internal passageway for increasing the heat transfer between the body and the cooling media; and an exit hole in fluid communication with the internal passageway for allowing the passage of a portion of the cooling media to the exterior surface of the body, at least a portion of the exit hole being defined by one of the plurality of pedestals.

Another form of the present invention contemplates a combination comprising: a gas turbine engine; an airfoil within the gas turbine engine, the airfoil having a passageway adapted for the passage of a cooling media therein, and the airfoil having an outer surface; a plurality of pedestals extending into the passageway for facilitating the transferring of heat from the airfoil to the cooling media; and an exit formed in the airfoil and in fluid communication with the passageway for the passage of cooling media from the passageway to the outer surface of the airfoil, and wherein at least a portion of the exit is formed through one of the plurality of pedestals.

Another aspect of the present invention contemplates an actively cooled component comprising: a body having a first internal passageway for the distribution of a cooling media, the body having an outer surface; a second internal passageway within the body, the second internal passageway disposed in fluid communication with the first internal passageway; and pedestal means positioned within the second internal passageway for allowing the passage of the cooling media to the outer surface.

One object of the present invention is to provide a unique actively cooled component.

Related objects and advantages of the present invention will be apparent from the following description.

BRIEF DESCRIPTION OF THE DRAWINGS

FIG. 5a is an illustrative plan view of one embodiment of the cooling pedestals and discharge apertures comprising a portion of the suction side of the FIG. 3 blade.

FIG. 5b is an illustrative plan view of another embodiment of the cooling pedestals and discharge apertures comprising a portion of the suction side of the FIG. 3 blade.

DESCRIPTION OF THE PREFERRED EMBODIMENT

Figure 1:
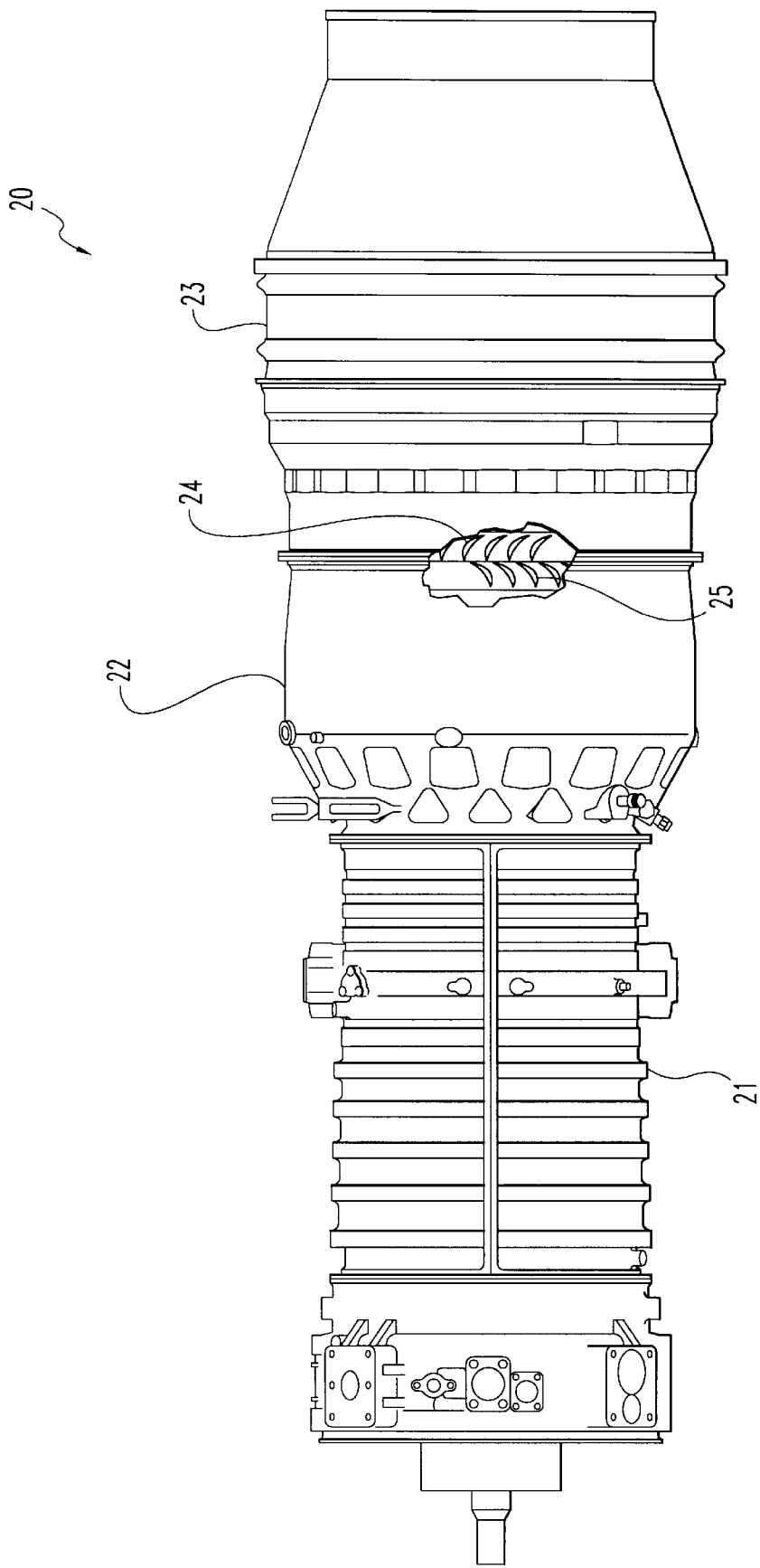
FIG. 1 is a partially fragmented perspective view of a gas turbine engine of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a gas turbine engine 20 which includes a compressor 21, a combustor 22 and a power turbine 23. The three components have been integrated together to produce an aircraft flight propulsion engine. The term aircraft is generic and includes helicopters, airplanes, missiles, unmanned space devices and any other substantially similar devices. It is important to realize that there are a multitude of ways in which the gas turbine engine components can be linked together. Additional compressors and turbines could be added with intercoolers connecting between the compressors and reheat combustion chambers could be added between the turbines.

Further, the gas turbine engine is equally suited to be used for an industrial application. Historically, there has been widespread application of industrial gas turbine engines, such as pumping sets for gas and oil transmission lines, electricity generation and naval propulsion.

A plurality of turbine blades 24 are coupled to a rotor disk that is affixed to a shaft rotatable within the gas turbine engine 20. A plurality of vanes 25 are conventionally joined together to collectively form a complete 360-degree nozzle. It is understood herein that gas turbine engine blades and vanes are often referred to as airfoils, and hereinafter this application will refer to blades and/or vanes as airfoils, unless specifically stated otherwise in the text. Other products utilizing the present invention are contemplated herein including but not limited to combustor liners, exhaust nozzles, exhaust liners, airframe wing leading edges, and/or other actively cooled components.

In one embodiment, the gas turbine engine airfoils are formed of a heat resistant superalloy composition. There are various types of superalloy compositions, such as but not limited to nickel based or cobalt based compositions, and the manufacturers of such compositions are generally known to those skilled in the art. Most superalloy compositions of interest are complicated mixtures of nickel, chromium, aluminum and other select elements. The airfoils may be of a unitary cast configuration, and/or an assembly of cast components, and/or an assembly of cast and wrought components. The airfoils may have an equiax, directionally solidified or a single crystal alloy structure. In one embodiment, the gas turbine engine airfoils 24 and 25 are of a cast single crystal single structure. Further, in alternate embodiments of the present invention the products are formed of a metallic material, or an intermetallic material or a ceramic material.

Figure 2:
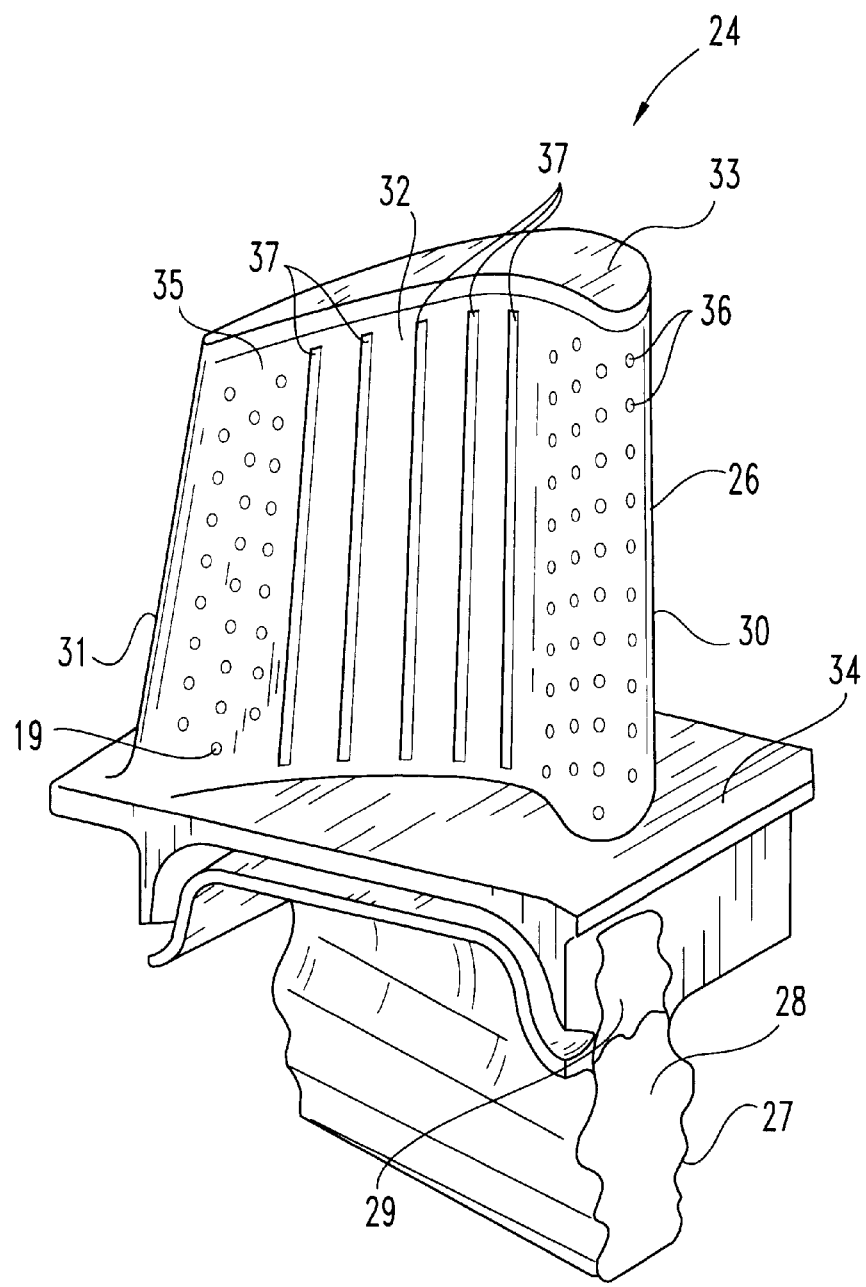
FIG. 2 is a perspective view of a blade comprising a portion of the FIG. 1 gas turbine engine.

With reference to FIG. 2, there is illustrated a perspective view of one embodiment of the gas turbine engine airfoil 24. The gas turbine engine airfoil has as principal regions an airfoil portion 26, a root portion 27 and a shank portion 28, which extends between the root portion 27, and the airfoil portion 26. The shank portion 28 has a central conduit 29 formed therein which is in fluid communication with a hollow cavity/passageway 30 (FIG. 3) within the airfoil 24. The hollow cavity 30 functions as an internal passageway for receiving cooling media from the compressor 21 and distributing it within the airfoil 24. The cooling media in the preferred environment is a compressible fluid such as air.

The airfoil 24 has a leading edge 30, a trailing edge 31, and an outer surface 32 extending therebetween. Hereinafter, the term spanwise will indicate an orientation between a tip 33 and a platform 34; and the term streamwise will indicate an orientation between the leading edge 30 and the trailing edge 31. The leading edge 30 faces in an upstream direction with respect to the approaching fluid flow and the trailing edge 31 faces in a downstream direction. The airfoil 24 includes a concave pressure side 35 and an opposite convex suction side (not illustrated). Arranged along the outer surface 32 of the airfoil 24 are a plurality of cooling media exit openings that allow for the discharge of cooling media across the outer surface. In one embodiment the cooling scheme includes: a plurality of exit apertures 36 spaced along the leading edge 26; a plurality of spaced discharge slots 37 spaced along a portion of the pressure side 35 of the airfoil; and a plurality of cooling apertures 19 spaced along a portion of the pressure side of the airfoil towards the trailing edge 31. However, other exit opening configurations are contemplated herein including but not limited to a design having: only a plurality of spaced apertures; or, a design having a plurality of spaced discharge slots; or, a design having a plurality of spaced discontinuous discharge slots. The suction side (not illustrated) includes a plurality of spaced apertures. It is understood that the blade 24 illustrated in FIG. 2 is not intended to be limiting and other cooling designs are contemplated herein. In one form of the present invention the cooling media openings are spread streamwise and spanwise to help compensate for the heat load on the airfoil related to the high temperature working fluid flowing thereover. The location, size, and quantity of cooling media exit openings is generally driven by the design parameters of a specific application.

Figure 3:
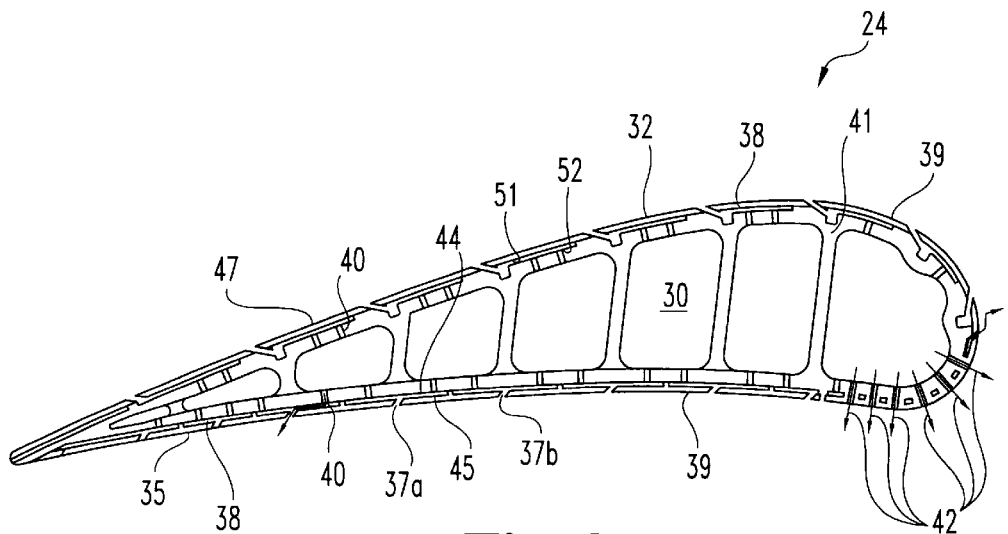
FIG. 3 is an illustrative view of one embodiment of a cooling system within a gas turbine blade.

With reference to FIG. 3, there is illustrated a sectional view of the airfoil 24. Airfoil 24 has it's passageway 30 extending therethrough for the delivery of cooling media to at least one cooling passageway 38 that is positioned adjacent the perimeter of the airfoil 24. In another preferred form of the present invention there are a plurality of cooling passageways 38 positioned around the perimeter of the airfoil 24. The cover member 39 defining the outer surface 32 of the airfoil 24 is a thin walled member, and preferably has a wall thickness in the range of about 0.015 inches to 0.025 inches. In a more preferred embodiment the cover member 39 has a wall thickness of about 0.020 inches. However, other wall thicknesses are contemplated herein. For clarity in illustration the sectional view of airfoil 24 of FIG. 3, has had the plurality of cooling pedestals removed. However, it is understood that there are in at least one embodiment of the present invention cooling pedestals within the cooling passageways 38. A plurality of apertures 40 are formed through the spar member 41 to allow the release of cooling media into the plurality of cooling passageways 38. Further, in one embodiment a plurality of apertures 42 are formed through the spar member 41 and the cover member 39. The plurality of apertures 42 provides for a direct discharge of cooling media onto the outer surface 32 adjacent the leading edge 26 of the airfoil.

Figure 4:
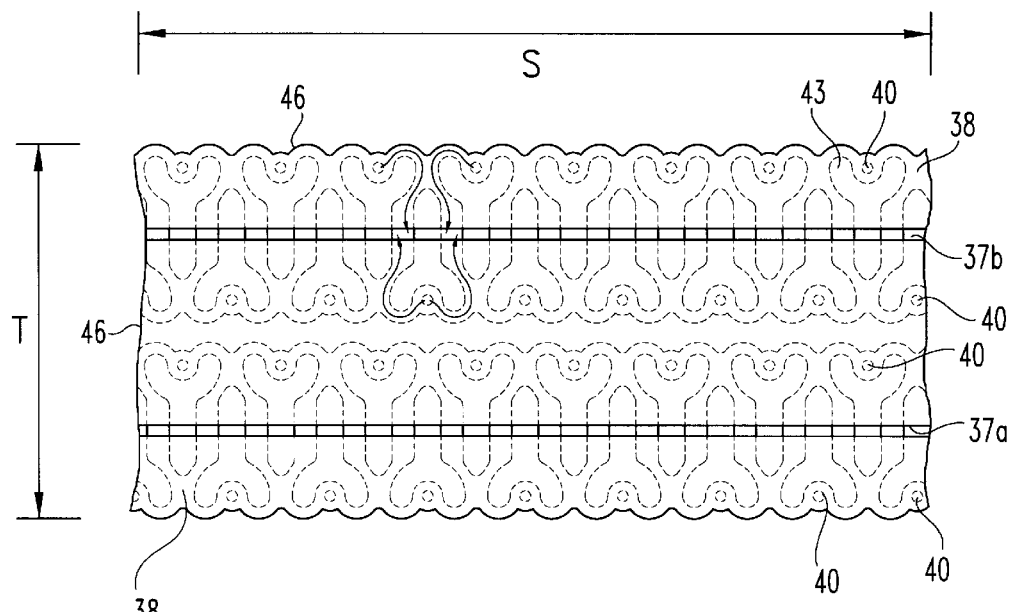
FIG. 4 is a top perspective view of one embodiment of the cooling pedestals and discharge slot comprising a portion of the pressure side of the FIG. 3 blade.

With reference to FIG. 4, there is illustrated a portion of the pressure side 35 of the airfoil 24. The portion has a spanwise orientation indicated by arrow 'S' and a streamwise orientation indicated by arrow 'T'. While the cooling scheme in FIG. 4 has been described with reference to the pressure side 35 of the airfoil, it is contemplated herein that the cooling scheme can also be utilized on the suction side 47 of the airfoil. Referring back to FIG. 3, will assist the reader in orienting the location of the discharge slots 37a and 37b on the pressure side 35. The pressure side is divided into a plurality of cooling passageways 38. In one embodiment each of the cooling passageways 38 has a plurality of cooling pedestals 43 that are conductively connected between a first surface 44 (FIG. 3) and a second surface 45 of the cooling passageway 38. One form of the present invention utilizes pedestals that are integrally cast with the airfoil 24. However, in another form of the present invention a cover sheet is metallurgically bonded to the plurality of cooling pedestals.

The size, number and spacing of the cooling pedestals 43 within the cooling passageways is variable depending upon specific flow requirement and the heat load at specific areas in the airfoil. In one form of the present invention the pedestals 43 have a "wish bone"/"Y" cross-section, however other geometric shapes are contemplated herein. The cooling passageways 38 on the pressure side 35 of the airfoil are separated by spanwise extending dams 46 that prevents streamwise flow between adjacent cooling passageways. The cooling media is introduced into each of the cooling passageways 38 through a plurality of apertures 40. In one embodiment the discharge of fluid from the cooling passageway 38 is through a continuous slot 37. The fluid flow enters the cooling passageway 38 through each of the apertures 40 and passes around the pedestals 43 to the discharge slot 37. In one preferred form the airfoil 24 has a plurality of cover members bonded to the spar, and the cover members are spaced from one another to define the continuous discharge slots. One technique for bonding the cover members to the spar is disclosed in an allowed commonly owned U.S. patent application Ser. No. 08/954,907 which is incorporated herein by reference. It is understood that an alternate embodiment contemplates a plurality of spaced apertures and/or a series of discontinuous slots could be utilized in place of the continuous slot.

With reference to FIG. 5a, there is illustrated a "counter-flow" cooling scheme for the cooling passageways 38 located on the suction side 47 of the airfoil 24. The portion 301 is oriented towards the trailing edge and the portion 302 is oriented towards the leading edge. While the cooling scheme in FIG. 5a has been described with reference to the suction side 47 of the airfoil it is contemplated herein that the cooling scheme can also be utilized on the pressure side 35 of the airfoil. The passageways include a plurality of pedestals 48 and fluid flow channels 49 therebetween. It is understood herein that the number, size and spacing of the pedestals is variable depending upon specific flow requirements and the heat load at specific areas in the airfoil. In one form of the present invention the pedestals have a rectangular cross-section, however other geometric shapes are contemplated herein including, but not limited to, circular, elliptical, and/or polygonal. The plurality of pedestals 48 and fluid flow channels 49 comprise an intricate cooling network within the cooling passageway 38 for the flow of cooling media. The cooling media is discharged from the hollow cavity/passageway 30 through the apertures 40 into the cooling passageway 38, wherein it passes around the exterior surfaces of the plurality of pedestals 48 to increase the convective heat transfer between the plurality of cooling pedestals 48 and the flowing media. The passage of cooling media through the cooling passageways 38 is controlled by the pressure differential between the inlet aperture 40 and the discharge apertures 50.

The plurality of pedestals 48 is conductively connected between a first surface 51 (FIG. 3) and a second surface 52 (FIG. 3) of the cooling passageway 38. In one form of the present invention the pedestals are integrally cast with the airfoil. However, in another form of the present invention a cover member is metallurgically bonded to the plurality of cooling pedestals. The pedestals and channels preferably having sizes as set forth in Table 1, however other sizes are contemplated herein.

TABLE 1

| Length | Width | Height |
|---|---|---|
| | PEDESTAL | |
| 0.020–.050" | 0.020–.050" | 0.012–.020" |
| | CHANNEL | |
| N/A | 0.012–.020" | 0.012–.020" |

A plurality of elongated pedestals 55 are formed in the cooling passageways 38. The location and quantity of elongated pedestals 55 is illustrative and is not intended to be limiting herein. In order to assist the reader in FIG. 5a, the cover member has been removed. The exit aperture 50 has a first portion 50a formed through the cover member and a second portion 50b formed through the elongated pedestal 55. The elongated pedestals are positioned within the flow path of the cooling media and have the exit aperture 50 passing therethrough. In a preferred form of the present invention the elongated pedestals 55 are conductively connected between the first surface 51 and the second surface 52 of the cooling passageway 38. In one form of the present invention the pedestals are integrally cast with the airfoil. However, in another form of the present invention a cover member is metallurgically bonded to the plurality of cooling pedestals. Further, in one embodiment there is included flow dividers/dams 300 to prevent flow migration between different portions of the cooling scheme.

With reference to FIG. 5b, there is illustrated an alternate "Dual Flow or Bi-Flow" cooling scheme for the cooling passageways 38 located on the suction side 47 of the airfoil 24. The portion 304 is oriented towards the leading edge and the portion 303 is oriented towards the trailing edge. While the cooling scheme in FIG. 5b has been described with reference to the suction side 47 of the airfoil, it is contemplated herein that the cooling scheme can also be utilized on the pressure side 35 of the airfoil. The passageways include a plurality of pedestals 70 and fluid flow channels 71 therebetween. It is understood herein that the number, size and spacing of the pedestals is variable depending upon specific flow requirements and the heat load at specific areas in the airfoil. In one form of the present invention the pedestals have a rectangular cross-section, however other geometric shapes are contemplated herein including, but not limited to, circular, elliptical, and/or polygonal. The plurality of pedestals 70 and fluid flow channels 71 comprise an intricate cooling network within the cooling passageway 38 for the flow of cooling media. The cooling media is discharged from hollow cavity/passageway 30 through the apertures 40 into the cooling passageway 38, wherein it passes around the exterior surfaces of the plurality of pedestals 70 to increase the convective heat transfer between the plurality of cooling pedestals 70 and the flowing media. The passage of cooling media through the cooling passageways 38 is controlled by the pressure differential between the inlet aperture 40 and the discharge apertures 72.

The plurality of pedestal 70 is conductively connected between the first surface 51 and the second surface 52 of the cooling passageway 38. In one form of the present invention the pedestals are integrally cast with the airfoil. However, in another form of the present invention a cover member is metallurgically bonded to the plurality of cooling pedestals. The pedestals and channels preferably having sizes as set forth in Table 1, however other sizes are contemplated herein.

A plurality of elongated pedestals 75 are formed in the cooling passageways 38. The location and quantity of elongated pedestals 75 is illustrative and is not intended to be limiting herein. In order to assist the reader, in FIG. 5b the cover member has been removed. The exit aperture 72 has a first portion 72a formed through the cover member and a second portion 72b formed through the elongated pedestal 75. The elongated pedestals are positioned within the flow path of the cooling media and have the exit aperture 72 passing therethrough. In a preferred form of the present invention the elongated pedestals 75 are conductively connected between the first surface 51 and the second surface 52 of the cooling passageway 38. In one form of the present invention the pedestals are integrally cast with the airfoil. However, in another form of the present invention a cover member is metallurgically bonded to the plurality of cooling pedestals.

Figure 6:
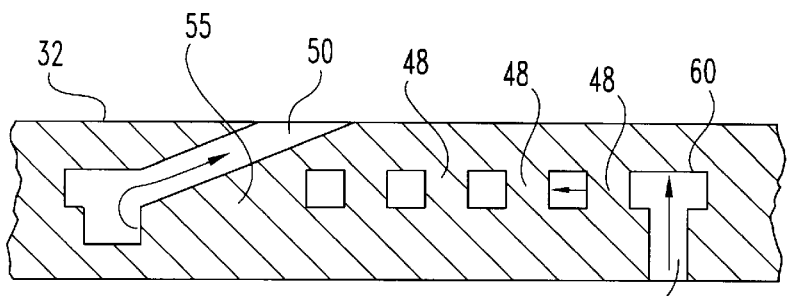
FIG. 6 is an illustrative sectional view of a cooling fluid discharge aperture comprising a portion of a cooling passageway.
Figure 7:
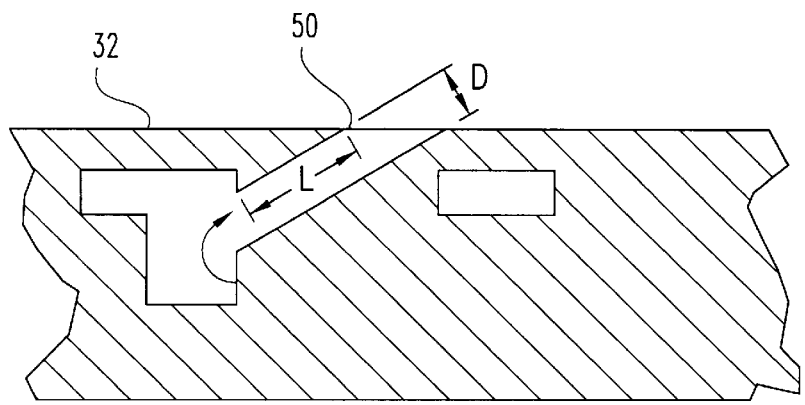
FIG. 7 is a sectional view of a cooling pedestal having a film cooling fluid discharge aperture formed therethrough.

Referring to FIGS. 6 and 7, there is illustrated an enlarged sectional view of a cooling passageway 38 having the cooling pedestals positioned therein. The cooling media exiting the hollow cavity/passageway 30 is discharged through aperture 40 into the cooling passageway. In one form the aperture 40 has a circular cross section and is formed transverse to the interior surface of the airfoil, thereby injecting the cooling media substantially transverse to the subsequent fluid flow within the cooling passageway. The cooling media flows into the cooling passageway 38 and contacts surface 60 so as to provide impingement cooling of the airfoil 24. The cooling media thereafter flowing around the plurality of cooling pedestals 48 and 55 until discharged through the discharge aperture 50 onto the outer surface 32 of the airfoil. While the cooling passageway has been described with reference to aperture 50 it is understood that the present invention is not limited to this embodiment.

In one form the discharge aperture 50 has a circular cross section, however other cross sectional geometries for the discharge aperture 50 are contemplated herein including, but not limited to: a rectangular cross section, a constant cross sectional area aperture, a diffusing cross sectional area, a fan shaped cross-sectional area, a cylindrical cross-sectional area and an ellipsoidal cross-sectional area. In one embodiment the discharge apertures 50 are formed at an acute angle to the outer surface 32 of the airfoil so as to allow the cooling media to exit along at least a portion of the outer surface in the streamwise direction. It is preferred that the acute angle be in the range of about 25–35 degrees so as to provide better fluid flow characteristics which enhances the film cooling protection and/or reduces aerodynamic loses along the outer surface 32 of the airfoil. However, discharge apertures at other angles are contemplated herein.

The exit discharge aperture 50 having a covered length 'L' and a diameter 'D'. In one form of the present invention the ratio of L/D is in the range of about two to three. Discharge apertures 50 having L/D ratios in this range are believed to provide good covered turning which assures that the angle of coolant discharge substantially matches the angle of the exit discharge aperture. The Hartzel Equation relates aerodynamic mixing loses with the coolant exit angle. A portion of the Hartzel equation provides that as the angle of the exit discharge aperture approaches zero the mixing loses are minimized, and as the angle of the exit discharge aperture approaches ninety degrees the mixing loses are maximized. The exit discharge apertures 50 being formed through the elongated pedestals by casting and/or machining. Further, the discharge apertures being formed through the elongated pedestals allows for shaped apertures, such as but not limited to diffusing apertures. One method of machining the discharge apertures 50 is by electric discharge machining.

Figure 7A:
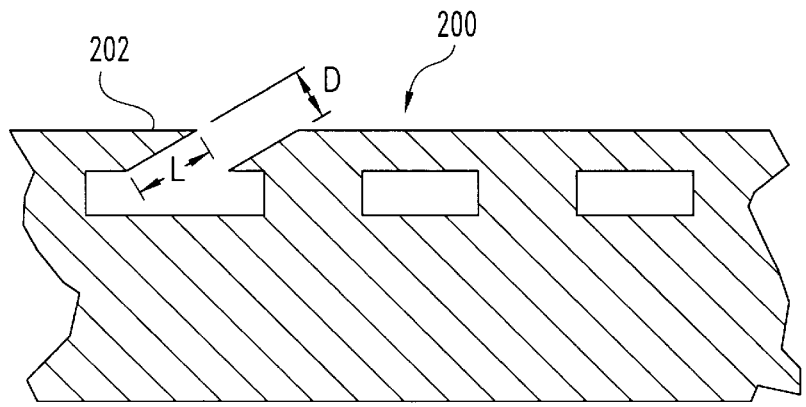
FIG. 7a is a diagrammatic view of a prior art airfoil having an angled discharge hole through a thin cover sheet.

With reference to FIG. 7a, there is illustrated a portion of a prior art product 200 having an angled discharge hole 201 through a thin cover sheet 202. As will be appreciated by those skilled in the art, this prior art product provides relatively poor covered turning and has a L/D ratio less than one.

Figure 8:
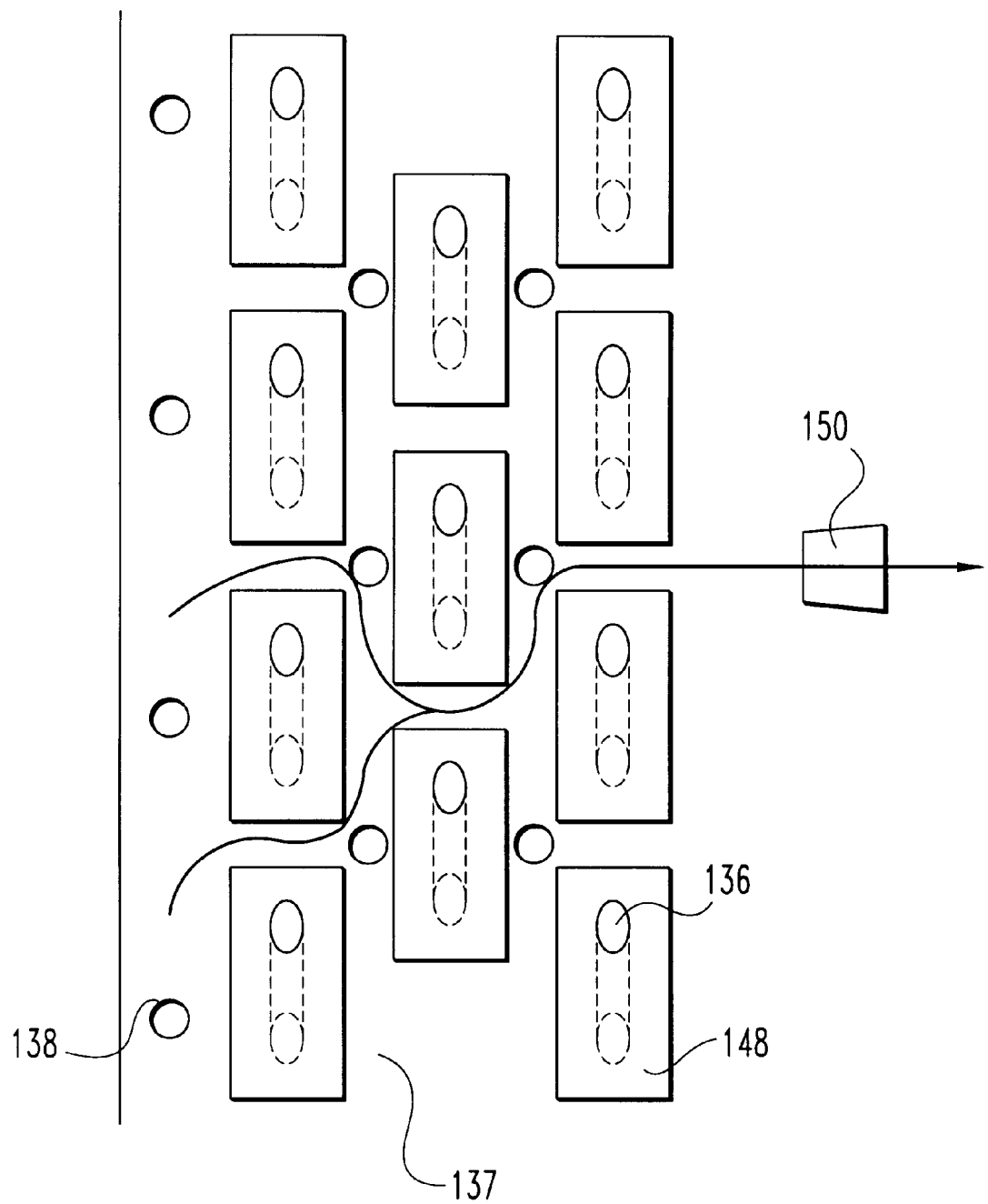
FIG. 8 is a diagrammatic view of an active cooling network for the leading edge portion of an airfoil.

With reference to FIG. 8, there is illustrated a diagrammatic view of an active cooling network for the leading edge portion of an airfoil. The cooling media is discharged from the hollow cavity/passageway 30 through the apertures 138 and into the cooling passageway 137 wherein it passes around the exterior surfaces of a plurality of pedestals 148 to increase the convective heat transfer between the plurality of cooling pedestals 148 and the flowing media. A portion of the cooling media is then discharged through an exit aperture 150 onto the outer surface of the airfoil. Exit aperture 150 is located on the forward suction side of the airfoil where static discharge pressure is less than the stagnation pressure. This allows a higher pressure drop across the aperture 138 and a resulting higher impingement cooling effectiveness. In one embodiment of the present invention, the static discharge pressure is within a range of about 10% to 20% less than the stagnation pressure. In one form of the present invention the cooling pedestals have a discharge aperture 136 formed therethrough which couples the central conduit to the outer surface of the airfoil. Thus allowing the passage of cooling media through the pedestal 148 to the outer surface of the airfoil. In a preferred embodiment the cooling media enters through the apertures 138 located on the pressure side of the leading edge and exits through the exit apertures 150 on the suction side of the leading edge.

Figure 9:
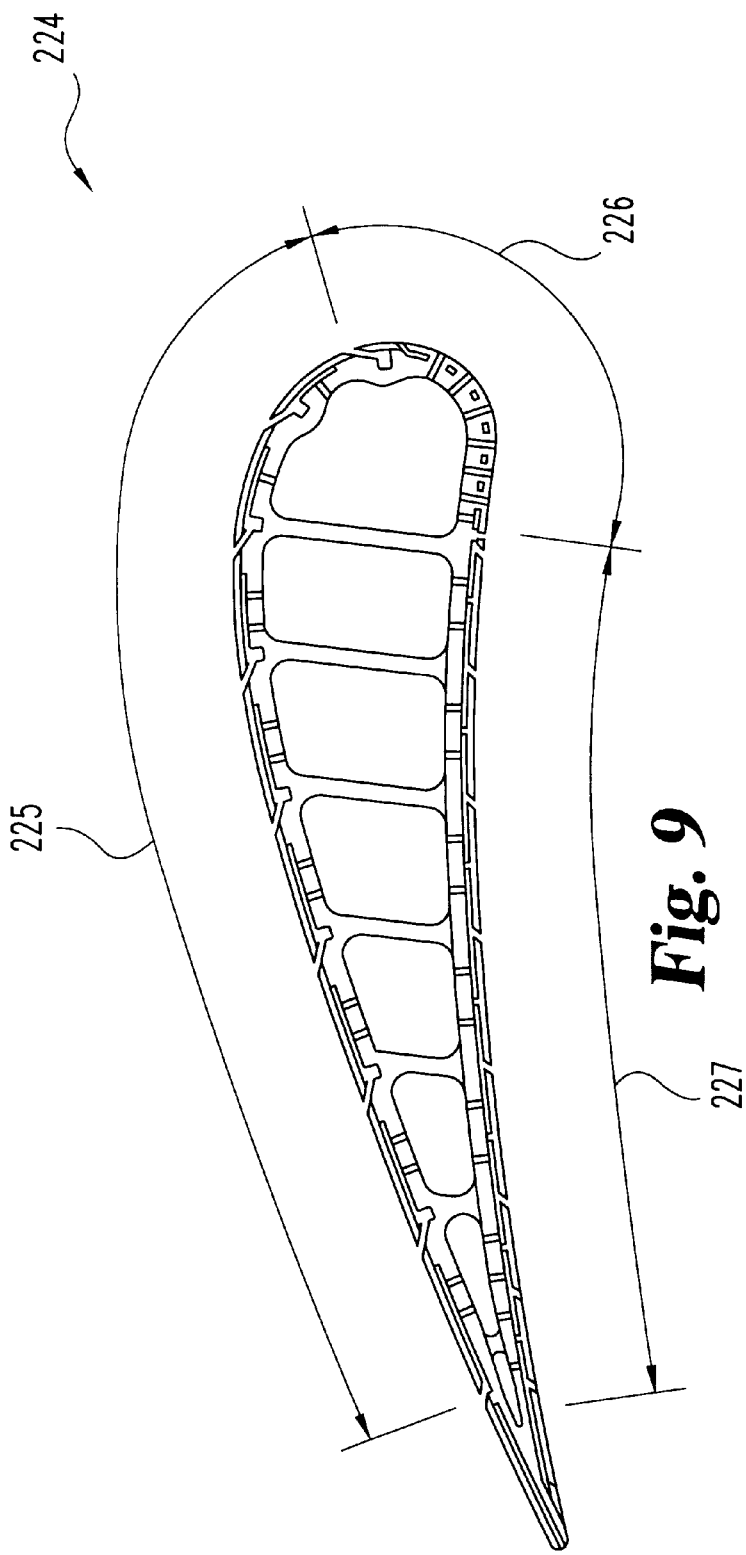
FIG. 9 is an illustrative view of another embodiment of a gas turbine engine airfoil.

Referring to FIG. 9, there is illustrated a sectional view of an airfoil 224. The airfoil has been divided into three primary cooling schemes 225, 226 and 227 that are integrated together. In one form the integrated system includes: cooling scheme 225 that has been described with reference to the counterflow cooling scheme in FIG. 5a; cooling scheme 226 that has been described with reference to the active cooling network in FIG. 8; and, the cooling scheme 227 that has been described with reference to the cooling scheme in FIG. 4. It is understood that other airfoil cooling schemes are contemplated herein.

Figure 10:
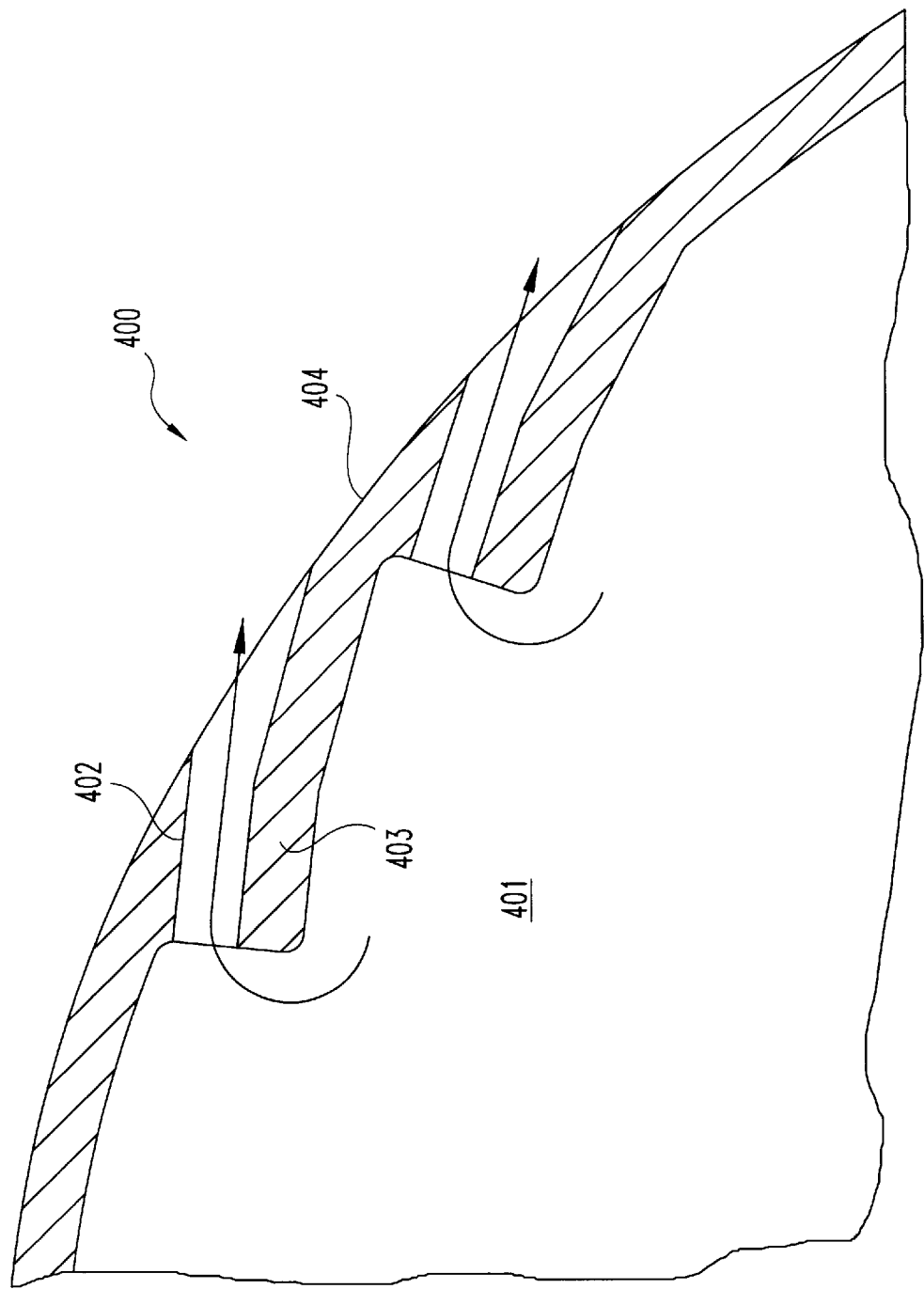
FIG. 10 is a partial sectional view of a portion of another embodiment of a gas turbine engine airfoil

Referring to FIG. 10, there is illustrated a portion of an actively cooled gas turbine engine airfoil 400. In a preferred embodiment the airfoil is a single walled structure. The airfoil has a hollow cavity/passageway 401 therein for receiving cooling media from the compressor and distributing it within the airfoil. The cooling media is passed through the airfoil and discharged through a discharge aperture 402 onto the outer surface 404 of the airfoil. The discharge aperture is formed through a thickened portion 403 of the airfoil. The manufacture of the discharge aperture through the thickened portion allows for good covered turning as previously discussed in this document. In one embodiment the thickened portion is a discrete localized thickened region, and in an alternate embodiment the thickened portion extends spanwise substantially from the tip to the hub. With reference to the specific embodiment illustrated in FIG. 10, there is illustrated one region having two adjoining thickened portions that extend spanwise in the airfoil. It should be understood that the thickened portions for receiving a discharge aperture may be continuous such as but not limited to a rib or may be discrete such as but not limited to an individual boss.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. An actively cooled component, comprising:
    a body having at least one internal passageway adapted for the passage of a cooling media therein, said body has a thin wall with an outer surface;
    a plurality of pedestals positioned within said passageway and adjacent said thin wall for enhancing heat transfer between said body and the cooling media; and
    one of said plurality of pedestals and said thin wall have an opening therethrough adapted for the passage of the cooling media to said outer surface, wherein the opening is defined through both one of said plurality of pedestals and said thin wall.

2. The component of claim 1, wherein the actively cooled component defines a gas turbine engine blade.

3. The component of claim 1, wherein another of said plurality of pedestals and said thin wall have another opening therethrough adapted for the passage of the cooling media to said outer surface, and further wherein said plurality of pedestals are coupled with said thin wall.

4. The component of claim 1, wherein said thin wall has a portion with a thickness in the range of about 0.015 inches to about 0.025 inches.

5. The component of claim 1, wherein said opening has a length and a diameter, and wherein said length divided by said diameter defines a ratio in the range of about two to about three.

6. The component of claim 1, wherein said opening is formed at an acute angle to the outer surface of said body.

7. The component of claim 5, wherein said body and said plurality of pedestals are cast, and wherein a majority of said plurality of pedestals has a length in the range of about 0.020 inches to 0.050 inches, and wherein said majority of said plurality of pedestals has a width in the range of about 0.020 to 0.050 inches, and wherein said internal passageway has a height in the range of about 0.012 inches to 0.020 inches.

8. The component of claim 1, wherein:
    said body is formed of a superalloy material;
    said at least one internal passageway defining a plurality of cooling passageways along said thin wall;
    each of said cooling passageways has a plurality of pedestals therein;
    said body further including a central passageway for distributing the cooling media to each of said plurality of cooling passageways; and
    each of said cooling passageway includes at least one of said plurality of pedestals with said opening for the passage of cooling media through said pedestal and said thin wall to said outer surface, said opening through said pedestal and said thin wall has a length and a diameter such that the ratio of said length and said diameter is in the range of about two to about three, and wherein said opening is formed at an acute angle to the outer surface of said body.

9. The component of claim 1, wherein said one of said plurality of pedestals having said opening therethrough is elongated.

10. An actively cooled component, comprising:
    a body having an internal passageway for distributing cooling media within said body, said body having an exterior surface;
    a plurality of pedestals coupled to said body and at least a portion of said plurality of pedestals extending into said internal passageway for increasing the heat transfer between said body and the cooling media; and
    an exit hole in fluid communication with said internal passageway for allowing the passage of a portion of the cooling media to the exterior surface of the body, at least a portion of the exit hole being defined by one of said plurality of pedestals.

11. The component of claim 10, wherein said outer surface defines an airfoil having a suction side and a pressure side.

12. The component of claim 10, wherein said body has a thin portion adjacent said internal passageway, and wherein said plurality of pedestals are connected to said thin portion.

13. The component of claim 12, wherein said exit hole is formed at an acute angle to said exterior surface of said body, and wherein said exit hole extending through said thin portion and said one of said plurality of pedestals has a ratio of it's length divided by it's diameter that is in a range of about two to three.

14. The component of claim 13, wherein said thin portion and said one of said plurality of pedestals is integrally formed of a superalloy material.

15. The component of claim 13, wherein said one of said plurality of pedestals defining at least a portion of said exit hole is elongated.

16. The component of claim 15, wherein said acute angle is in the range of about twenty-five to thirty-five degrees, and wherein said thin portion has a thickness of about 0.020 inches.

17. The component of claim 15, wherein the component is formed of a superalloy material.

18. A combination, comprising:
a gas turbine engine;
an airfoil within said gas turbine engine, said airfoil having a passageway adapted for the passage of a cooling media therein, and said airfoil having an outer surface;
a plurality of pedestals connected to said airfoil and extending into said passageway for facilitating the transferring of heat from said airfoil to the cooling media; and
an exit formed in said airfoil and in fluid communication with said passageway for the passage of cooling media from said passageway to said outer surface of said airfoil, and wherein said exit is formed through one of said plurality of pedestals.

19. The combination of claim 18, which further includes a central conduit adapted for distributing the cooling media to said passageway, and wherein said exit is formed at an acute angle to said outer surface, and further wherein said outer surface is defined on a thin wall portion of said airfoil.

20. The combination of claim 19, wherein said exit in the airfoil has a length and a diameter, and wherein said length divided by said diameter defines a ratio within a range of about two to about three.

21. The combination of claim 18, wherein said one of said plurality of pedestals is elongated.

22. The combination of claim 21, which further includes a central conduit for distributing the cooling media to said passageway, and wherein said exit is formed at an acute angle to said outer surface, and further wherein said outer surface is defined on a thin wall portion of said airfoil.

23. The combination of claim 22, wherein said exit in the airfoil has a length and a diameter, and wherein said length divided by said diameter defines a ratio within a range of about two to about three.

24. The combination of claim 23, wherein said airfoil is formed of a superalloy.

25. The combination of claim 23, wherein said airfoil is formed of an intermetallic material.

26. An actively cooled component, comprising:
a body having a first internal passageway for the distribution of a cooling media, said body having an outer surface;
a second internal passageway within said body, said second internal passageway disposed in fluid communication with said first internal passageway; and
pedestal means positioned within said second internal passageway for allowing the passage of the cooling media to said outer surface, wherein said pedestal means including a heat transfer pedestal having an opening passing therethrough.

27. The component of claim 26, wherein said pedestal means provides covered turning for said cooling media.

28. The component of claim 26, wherein said second internal passageway is disposed along a portion of said outer surface of said body, and said first internal passageway is spaced radially inward from said second internal passageway.

29. The component of claim 26, wherein said heat transfer pedestal is an elongated pedestal.

30. The component of claim 29, wherein the body is formed of one of a metal material, an intermetallic material and a ceramic material.

31. The component of claim 29, wherein said opening is formed at an acute angle to said outer surface.

32. The component of claim 26, which further includes a plurality of second internal passageways formed adjacent the outer surface of said body, and each of said plurality of second internal passageways includes said pedestal means having a heat transfer pedestal with an opening passing therethrough.

33. An actively cooled component, comprising:
a body having an internal passage adapted for distributing a cooling media within said body, said body has a plurality of holes formed therein and connected to said internal passage and a thin outer wall member with an exterior surface, said body defining an airfoil having a spanwise orientation and a streamwise orientation;
a plurality of cooling passages positioned within said body adjacent said thin outer wall member and in fluid communication with at least a portion of said plurality of holes, said plurality of cooling passages are separated from one another by a barrier member extending in said spanwise orientation;
a plurality of cooling pedestals located within said plurality of cooling passages and conductively connected to said body, at least one of said plurality of cooling passages has one of said plurality of holes positioned adjacent to one of said plurality of cooling pedestals to discharge cooling media into said at least one of said plurality of cooling passages and flow the cooling media along an outer surface of said one of said plurality of cooling pedestals; and
at least one discharge hole in said body and connected to said at least one of said plurality of cooling passages for discharging the cooling media flowing along said outer surface of said at least one of said plurality of cooling pedestals to said exterior surface, wherein said one of said plurality of cooling pedestals partially wraparound said at least one discharge hole in said body.

34. The component of claim 33, wherein said at least one discharge hole defines a slot extending in a substantially spanwise orientation.

35. The component of claim 34, wherein said plurality of cooling pedestals have a substantially Y shape, and wherein said one of said plurality of holes is located between the forks of said Y shape, and wherein said plurality of cooling pedestals are spaced along said spanwise orientation of said passage.

36. An actively cooled component, comprising:
a body having an internal passage adapted for the passage of a cooling media therein, said body has a thin wall member with an outer surface defining an airfoil; and
at least one reinforcing member adjacent to and connected with a part of said thin wall member to define a thickened region, said thickened region has at least one cooling media discharge opening therethrough for the passage of cooling media from said internal passageway to said outer surface.

37. The component of claim 36, wherein said airfoil has a tip end and a hub end, and wherein said thickened region extending between said tip end and said hub end, and wherein said at least one cooling media discharge opening defining a plurality of spaced cooling media discharge openings.

38. The component of claim 36, wherein said cooling media discharge opening has a length and a diameter, and wherein said length divided by said diameter defines a ratio in the range of about two to about three, and wherein said cooling media discharge opening has a centerline that is at an acute angle to said outer surface.

39. The component of claim 36, wherein the body is a cast structure formed of a metallic material.

40. The component of claim 36, wherein said body and said at least one reinforcing member and said thin wall member are integral, and wherein said cooling media discharge opening has a length and a diameter, and wherein said length divided by said diameter defines a ratio in the range of about two to about three, and wherein said cooling media discharge opening has a centerline that is at an acute angle to said outer surface.

* * * * *